US012707074B2

(12) United States Patent
Yan et al.

(10) Patent No.: US 12,707,074 B2
(45) Date of Patent: Aug. 11, 2026

(54) LOCAL ILLUMINATION COMPENSATION FOR INTER PREDICTION

(71) Applicant: BEIJING DAJIA INTERNET INFORMATION TECHNOLOGY CO., LTD., Beijing (CN)

(72) Inventors: Ning Yan, San Diego, CA (US); Hong-Jheng Jhu, San Diego, CA (US); Yiwen Chen, San Diego, CA (US); Xiaoyu Xiu, San Diego, CA (US); Wei Chen, San Diego, CA (US); Chewei Kuo, San Diego, CA (US); Han Gao, Beijing (CN); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 19 days.

(21) Appl. No.: 18/780,941

(22) Filed: Jul. 23, 2024

(65) Prior Publication Data

US 2025/0030882 A1 Jan. 23, 2025

Related U.S. Application Data

(63) Continuation of application No. PCT/US2023/060868, filed on Jan. 19, 2023.

(Continued)

(51) Int. Cl.
*H04N 19/105* (2014.01)
*H04N 19/176* (2014.01)

(Continued)

(52) U.S. Cl.
CPC ........... *H04N 19/44* (2014.11); *H04N 19/105* (2014.11); *H04N 19/176* (2014.11); *H04N 19/186* (2014.11)

(58) Field of Classification Search
CPC ............................ H04N 19/44; H04N 19/105
See application file for complete search history.

(56) References Cited

U.S. PATENT DOCUMENTS 11,902,560 B2 * 2/2024 Chen .................... H04N 19/139
11,962,759 B2 * 4/2024 Xiu ...................... H04N 19/105

(Continued)

FOREIGN PATENT DOCUMENTS

| | | | |
|---|---|---|---|
| EP | 3737099 | A1 | 11/2020 |
| WO | WO 2020192717 | A1 | 10/2020 |
| WO | WO 2022/178433 | A1 | 8/2022 |

OTHER PUBLICATIONS

Li et al., "Sub-sampled Cross-component Prediction for Emerging Video Coding Standards," IEEE Transactions on Image Processing, Dec. 2020: 1-11.

(Continued)

*Primary Examiner* — Irfan Habib
(74) *Attorney, Agent, or Firm* — Crowell & Moring LLP

(57) ABSTRACT

A method for video encoding comprises determining a mode of Local Illumination Compensation (LIC) for the video encoding to be enabled; calculating LIC parameters for the mode of LIC with a limited number of reference sample pairs, wherein a reference sample pair refers to a luma reference sample and a chroma reference sample; enabling the mode of LIC for the video encoding with the calculated LIC parameters to perform LIC for inter prediction to generate a prediction residual; and forming and outputting a bit-stream encoded with the prediction residual and prediction mode information indicating the mode of LIC.

17 Claims, 14 Drawing Sheets

Related U.S. Application Data

(60) Provisional application No. 63/302,919, filed on Jan. 25, 2022.

(51) Int. Cl.
*H04N 19/186* (2014.01)
*H04N 19/44* (2014.01)

(56) References Cited

U.S. PATENT DOCUMENTS

| | | | | |
|---|---|---|---|---|
| 11,997,308 | B2 * | 5/2024 | Bordes | H04N 19/52 |
| 12,452,438 | B1 * | 10/2025 | Bae | H04N 19/186 |
| 2018/0098086 | A1 * | 4/2018 | Chuang | H04N 19/198 |
| 2019/0215522 | A1 * | 7/2019 | Zhang | H04N 19/176 |
| 2021/0377539 | A1 | 12/2021 | Shingala et al. | |
| 2021/0409683 | A1 | 12/2021 | Chen et al. | |
| 2025/0080764 | A1 * | 3/2025 | Jhu | H04N 19/186 |

OTHER PUBLICATIONS

International Search Report and Written Opinion in International Application No. PCT/US2023/060868, dated May 17, 2023, 10 pages.
English-language Search Report issued in European Application No. 23747755.9 dated Dec. 12, 2025 (14 pages).

* cited by examiner

LOCAL ILLUMINATION COMPENSATION FOR INTER PREDICTION

CROSS-REFERENCE TO RELATED APPLICATION

This application is a continuation application of PCT Patent Application No. PCT/US2023/060868, filed on Jan. 19, 2023, which is based upon and claims priority to Provisional Application No. 63/302,919 filed on Jan. 25, 2022, wherein the content of the above-referenced applications is incorporated herein by reference in its entirety.

TECHNICAL FIELD

This application is related to video coding and compression. More specifically, this application relates to methods and apparatus on improving the coding efficiency and simplifying the complexity of local illumination compensation (LIC).

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

In an aspect, there is proposed a method for video encoding, comprising: determining a mode of Local Illumination Compensation (LIC) for the video encoding to be enabled; calculating LIC parameters for the mode of LIC with a limited number of reference sample pairs, wherein a reference sample pair refers to a luma reference sample and a chroma reference sample; enabling the mode of LIC for the video encoding with the calculated LIC parameters to perform LIC for inter prediction to generate a prediction residual; and forming and outputting a bit-stream encoded with the prediction residual and prediction mode information indicating the mode of LIC.

In an aspect, there is proposed an apparatus for video encoding, comprising: a memory to store an instruction; and a processor to execute the instruction such that the processor is configured to: determine a mode of Local Illumination Compensation (LIC) for the video encoding to be enabled; calculate LIC parameters for the mode of LIC with a limited number of reference sample pairs, wherein a reference sample pair refers to a luma reference sample and a chroma reference sample; enable the mode of LIC for the video encoding with the calculated LIC parameters to perform LIC for inter prediction to generate a prediction residual; form and output a bit-stream encoded with the prediction residual and prediction mode information indicating the mode of LIC.

In an aspect, there is proposed a method for video decoding, comprising: receiving and decoding a bit-stream to obtain a prediction residual and prediction mode information indicating a mode of Local Illumination Compensation (LIC) to be enabled; forming a residual block from the prediction residual and forming a prediction block from the prediction mode information; and reconstructing a reconstructed block from the residual block and prediction block; wherein LIC parameters for the mode of LIC are calculated with a limited number of reference sample pairs, and wherein a reference sample pair refers to a luma reference sample and a chroma reference sample.

In an aspect, there is proposed an apparatus for video decoding, comprising: a memory to store an instruction; and a processor to execute the instruction such that the processor is configured to: receive and decode a bit-stream to obtain a prediction residual and prediction mode information indicating a mode of Local Illumination Compensation (LIC) to be enabled; form a residual block from the prediction residual and form a prediction block from the prediction mode information; and reconstruct a reconstructed block from the residual block and prediction block; wherein LIC parameters for the mode of LIC are calculated with a limited number of reference sample pairs, and wherein a reference sample pair refers to a luma reference sample and a chroma reference sample.

In an aspect, there is proposed a computer readable medium having stored thereon instructions that when executed cause a computing device to perform the above methods.

In an aspect, there is proposed a computer readable storage medium having stored therein a bitstream for execution by an encoding device having one or more processors, wherein the bitstream, when executed by the one or more processors, causes the encoding device to perform the above method for video encoding.

In an aspect, there is proposed a computer readable storage medium having stored therein a bitstream for execution by a decoding device having one or more processors, wherein the bitstream, when executed by the one or more processors, causes the decoding device to perform the above method for video decoding.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. A Joint Video Exploration Team (JVET) was formed in October 2015 by ITU-T VECG and ISO/IEC MPEG to begin significant study of advanced technologies that could enable substantial enhancement of coding efficiency. A reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, a reference software codebase, called VVC test model (VTM), was established for demonstrating a reference implementation of the VVC standard.

Figure 1:
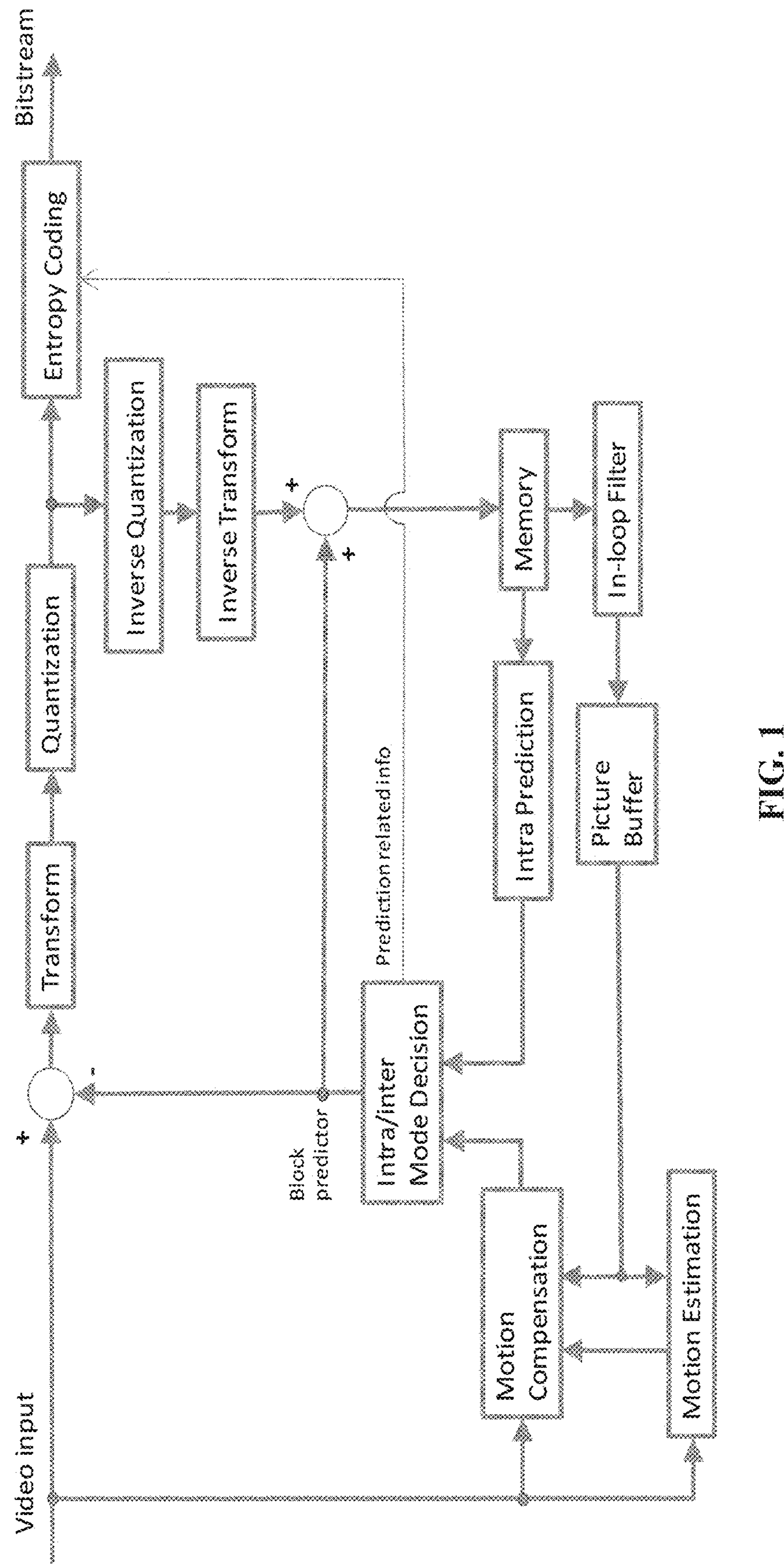
FIG. 1 illustrates a block diagram of a generic block-based hybrid video encoding system.
Figure 2:
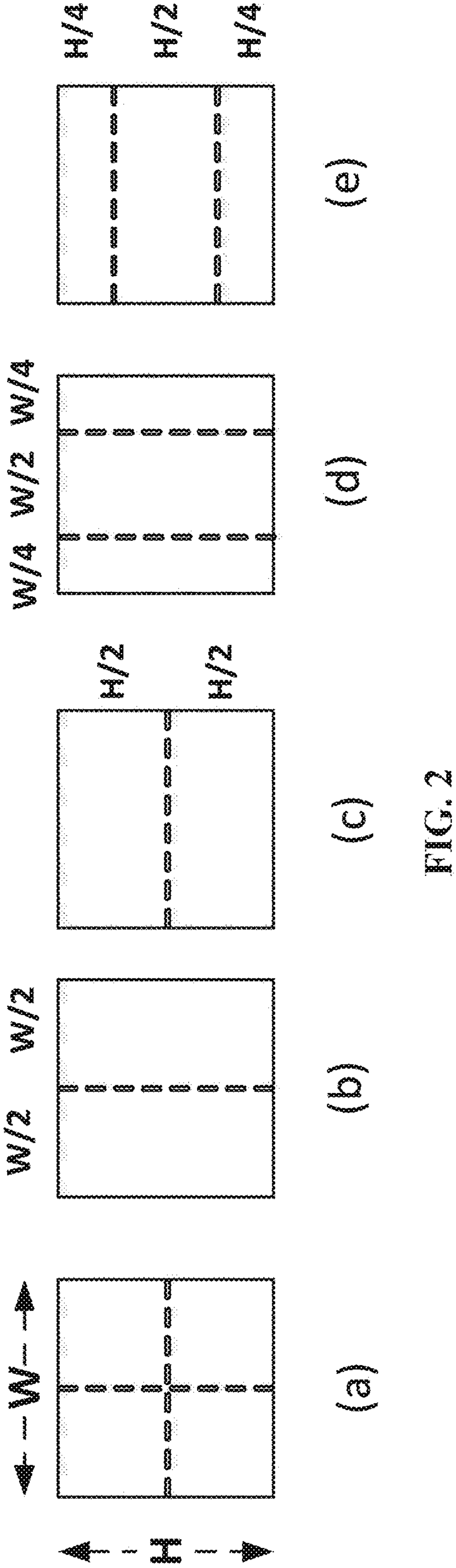
FIG. 2 illustrates a diagram of block partitions in the multi-type tree structure: (a) quaternary partition; (b) vertical binary partition; (c) horizontal binary partition; (d) vertical ternary partition; (e) horizontal ternary partition.

Like HEVC, the VVC is built upon the block-based hybrid video coding framework. FIG. 1 gives a block diagram of a generic block-based hybrid video encoding system. An input video signal is processed block by block (called coding units (CUs)). In VTM-1.0, a CU can be up to 128×128 pixels. However, different from the HEVC which partitions blocks only based on quad-trees, in the VVC, a coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, a CTU is firstly partitioned by a quad-tree structure. Then, each quad-tree leaf node can be further partitioned by a binary and ternary tree structure. As shown in FIG. 2, there are five splitting types, quaternary partitioning, horizontal binary partitioning, vertical binary partitioning, horizontal ternary partitioning, and vertical ternary partitioning. In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, a reference picture index is additionally sent, which is used to identify from which reference picture in the reference picture store the temporal prediction signal comes. After spatial and/or temporal prediction, the mode decision block in the encoder chooses the best prediction mode, for example based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream.

Figure 3:
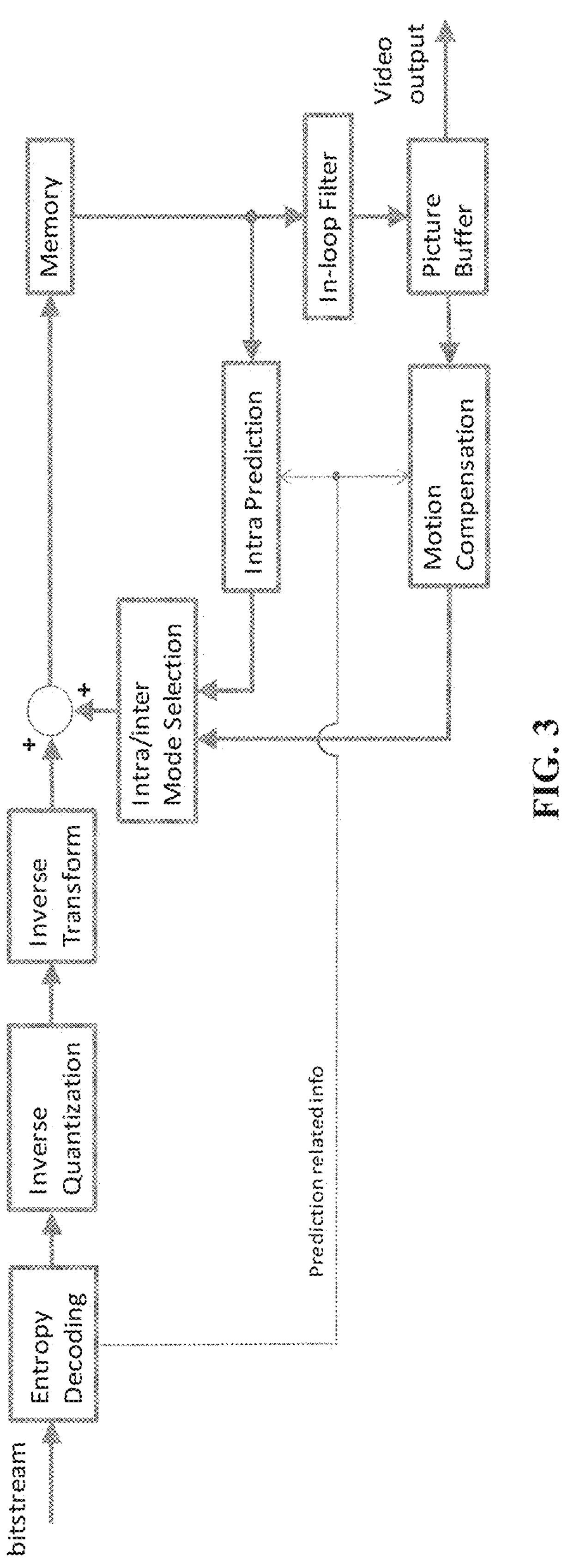
FIG. 3 illustrates a general block diagram of a block-based video decoder.

FIG. 3 gives a general block diagram of a block-based video decoder. The video bit-stream is first entropy decoded at entropy decoding unit. The coding mode and prediction information are sent to either the spatial prediction unit (if intra coded) or the temporal prediction unit (if inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

In general, the basic intra prediction scheme applied in the VVC is kept the same as that of the HEVC, except that several modules are further extended and/or improved, e.g., intra sub-partition (ISP) coding mode, extended intra prediction with wide-angle intra directions, position-dependent intra prediction combination (PDPC) and 4-tap intra interpolation. The main focus of this disclosure is to further improve the coding efficiency of the existing LIC mode. Additionally, some methods are also proposed to reduce the LIC computational complexity and make it more friendly for practical hardware implementations. To facilitate the following description, the related background knowledge is elaborated in the following sections.

Cross-Component Linear Model Prediction

Figure 4A:
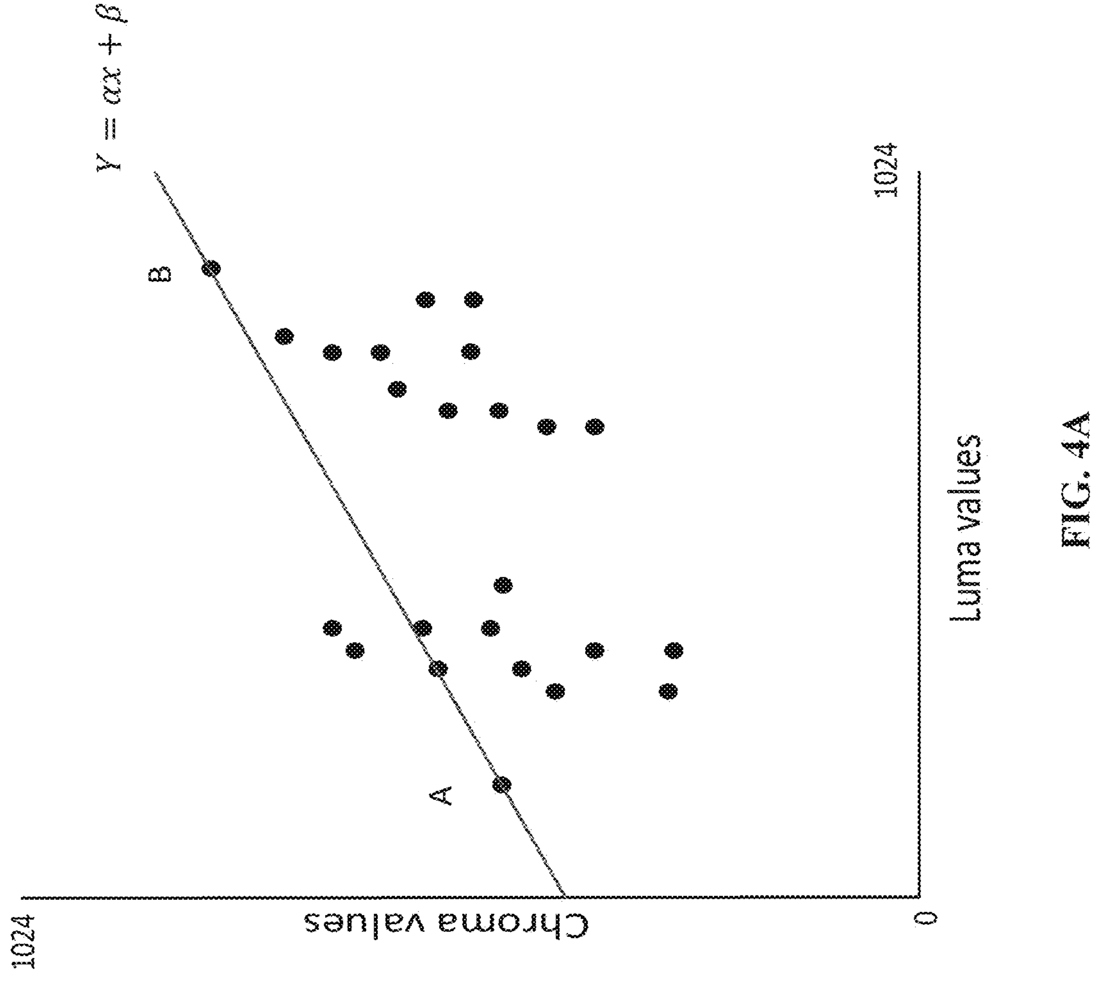
FIG. 4A illustrates a diagram of straight line derivation of $\alpha$ and $\beta$ using the min-Max method.

To reduce the cross-component redundancy, a cross-component linear model (CCLM) prediction mode is used in VVC, for which the chroma samples are predicted based on the reconstructed luma samples of the same CU by using a linear model as follows:

$$pred_C(i,j)=\alpha\cdot rec'_L(i,j)+\beta \quad (1)$$

where $pred_C(i,j)$ represents the predicted chroma samples in a CU and $rec_L'(i,j)$ represents the downsampled reconstructed luma samples of the same CU. Linear model parameter α and β are derived from the straight-line relationship between luma values and chroma values from two samples, which are minimum luma sample A ($X_A$, $Y_A$) and maximum luma sample B ($X_B$, $Y_B$) inside the set of neighboring luma samples, as exemplified in FIG. 4A. Here $X_A$, $Y_A$ are the x-coordinate (i.e. luma value) and y-coordinate (i.e. chroma value) value for sample A, and $X_B$, $Y_B$ are the x-coordinate and y-coordinate value for sample B. The linear model parameters α and β are obtained according to the following equations.

$$\alpha=\frac{y_B-y_A}{x_B-x_A} \quad (2)$$

$$\beta=y_A-\alpha x_A$$

Such a method is also called min-Max method. The division in the equation above could be avoided and replaced by a multiplication and a shift.

Figure 4B:
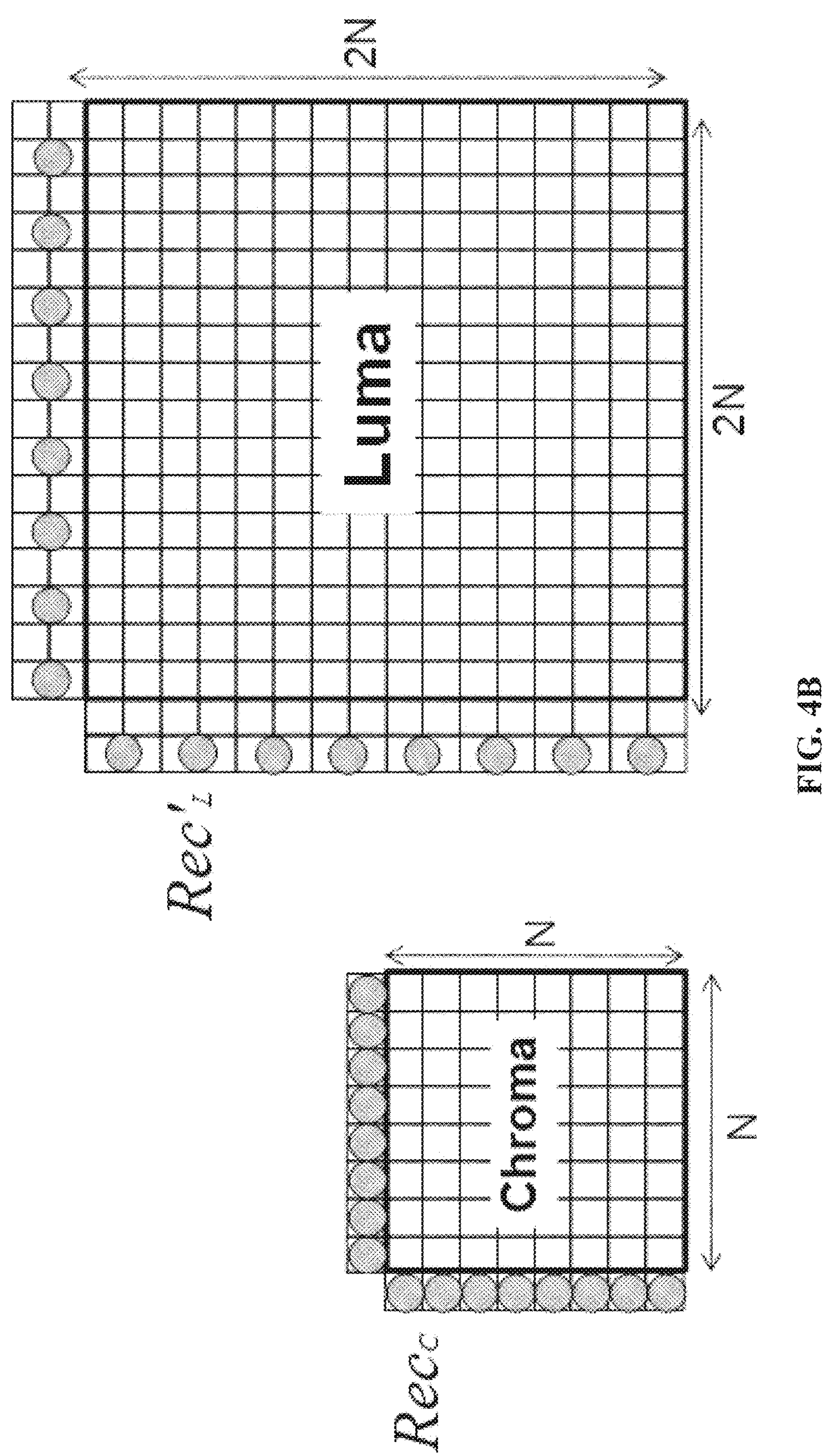
FIG. 4B illustrates a diagram of locations of the samples used for the derivation of $\alpha$ and $\beta$.

For a coding block with a square shape, the above two equations are applied directly. For a non-square coding block, the neighboring samples of the longer boundary are first subsampled to have the same number of samples as for the shorter boundary. FIG. 4B shows the location of the left and above samples and the sample of the current block involved in the CCLM mode.

Besides the scenario wherein the above template and the left template are used to calculate the linear model coefficients, the two templates also can be used alternatively in the other two LM modes, called LM_A, and LM_L modes.

In LM_A mode, only pixel samples in the above template are used to calculate the linear model coefficients. To get more samples, the above template is extended to the size of (W+W). In LM_L mode, only pixel samples in the left template are used to calculate the linear model coefficients. To get more samples, the left template is extended to the size of (H+H).

Note that when the upper reference line is at the CTU boundary, only one luma row (which is stored in line buffer for intra prediction) is used to make the down-sampled luma samples.

For chroma intra mode coding, a total of 8 intra modes are allowed for chroma intra mode coding. Those modes include five traditional intra modes and three cross-component linear model modes (CCLM, LM_A, and LM_L). Chroma mode signaling and derivation process are shown in Table 1. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 1

Derivation of chroma prediction mode from luma mode when CCLM is enabled

| | Corresponding luma intra prediction mode | | | | |
|---|---|---|---|---|---|
| Chroma prediction mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

Multi-Model Linear Model Prediction

Figure 5:
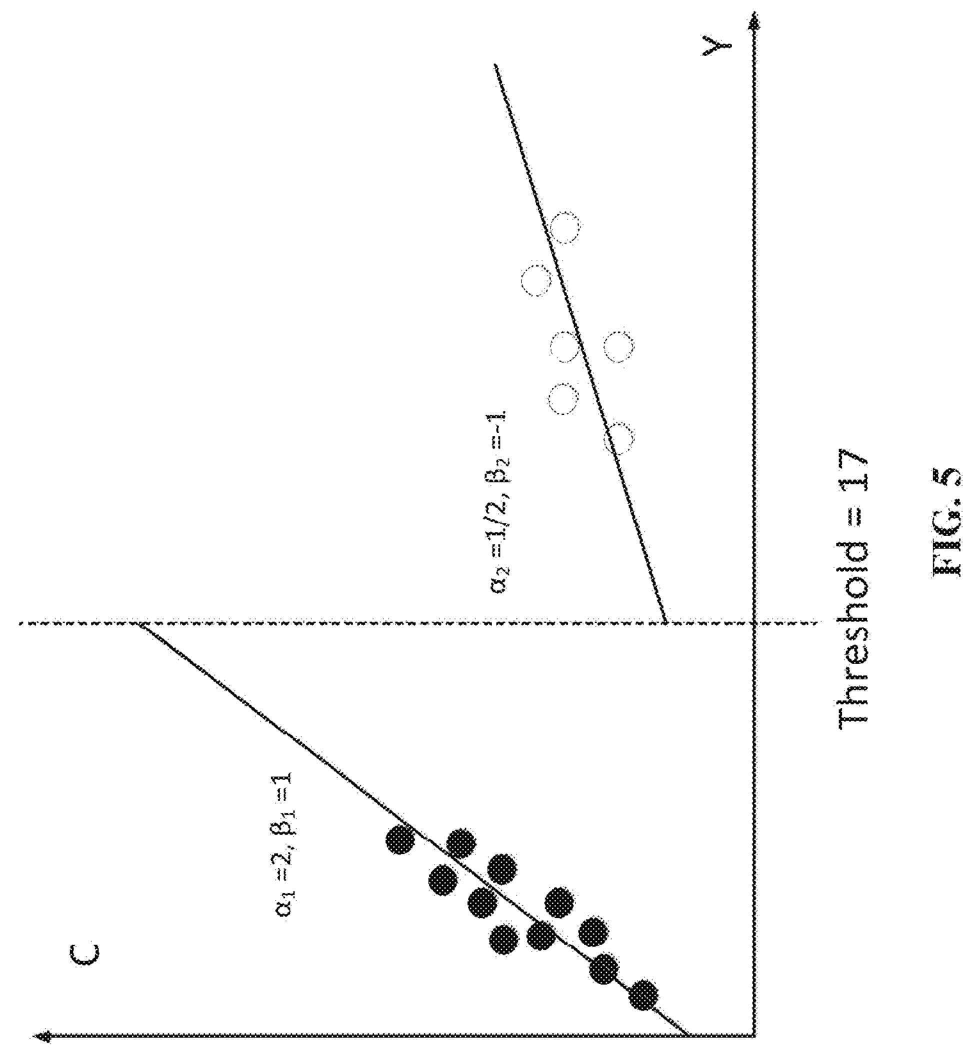
FIG. 5 illustrates a diagram of an example of classifying the neighboring samples into two groups based on the value Threshold.

To reduce the cross-component redundancy, multi-model LM (MMLM) prediction mode is proposed, for which the chroma samples are predicted based on the reconstructed luma samples of the same CU by using two linear models as follows:

$$\begin{cases} pred_C(i,j)=\alpha_1\cdot rec'_L+\beta_1 & \text{if } rec'_L(i,j)\le \text{Threshold} \\ pred_C(i,j)=\alpha_2\cdot rec'_L+\beta_2 & \text{if } rec'_L(i,j)> \text{Threshold} \end{cases} \quad (3)$$

where $pred_C(i,j)$ represents the predicted chroma samples in a CU and $rec_L'(i,j)$ represents the downsampled reconstructed luma samples of the same CU. Threshold is calculated as the average value of the neighboring reconstructed luma samples. FIG. 5 shows an example of classifying the neighboring samples into two groups based on the value Threshold. For each group, parameter $\alpha_i$ and $\beta_i$, with i equal to 1 and 2 respectively, are derived from the straight-line relationship between luma values and chroma values from two samples, which are minimum luma sample A ($X_A$, $Y_A$) and maximum luma sample B ($X_B$, $Y_B$) inside the group. Here $X_A$, $Y_A$ are the x-coordinate (i.e. luma value) and y-coordinate (i.e. chroma value) value for sample A, and $X_B$, $Y_B$ are the x-coordinate and y-coordinate value for sample B. The linear model parameters α and β are obtained according to the following equations.

$$\alpha=\frac{y_B-y_A}{x_B-x_A} \quad (4)$$

$$\beta=y_A-\alpha x_A$$

Such a method is also called min-Max method. The division in the equation above could be avoided and replaced by a multiplication and a shift.

For a coding block with a square shape, the above two equations are applied directly. For a non-square coding block, the neighboring samples of the longer boundary are first subsampled to have the same number of samples as for the shorter boundary.

Besides the scenario wherein the above template and the left template are used together to calculate the linear model coefficients, the two templates also can be used alternatively in the other two MMLM modes, called MMLM_A, and MMLM_L modes.

In MMLM_A mode, only pixel samples in the above template are used to calculate the linear model coefficients. To get more samples, the above template is extended to the size of (W+W). In MMLM_L mode, only pixel samples in the left template are used to calculate the linear model coefficients. To get more samples, the left template is extended to the size of (H+H).

Note that when the upper reference line is at the CTU boundary, only one luma row (which is stored in line buffer for intra prediction) is used to make the down-sampled luma samples.

For chroma intra mode coding, a total of 11 intra modes are allowed for chroma intra mode coding. Those modes include five traditional intra modes and six cross-component linear model modes (CCLM, LM_A, LM_L, MMLM, MMLM_A and MMLM_L). Chroma mode signaling and derivation process are shown in Table 2. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 2

Derivation of chroma prediction mode from luma mode when MMLM is enabled

| Chroma prediction mode | Corresponding luma intra prediction mode 0 | 50 | 18 | 1 | X (0 <= X <= 66) |
|---|---|---|---|---|---|
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 84 | 84 | 84 | 84 | 84 |
| 8 | 85 | 85 | 85 | 85 | 85 |
| 9 | 86 | 86 | 86 | 86 | 86 |
| 10 | 0 | 50 | 18 | 1 | X |

Adaptive Enabling of LM and MMLM for Prediction

Figure 6:
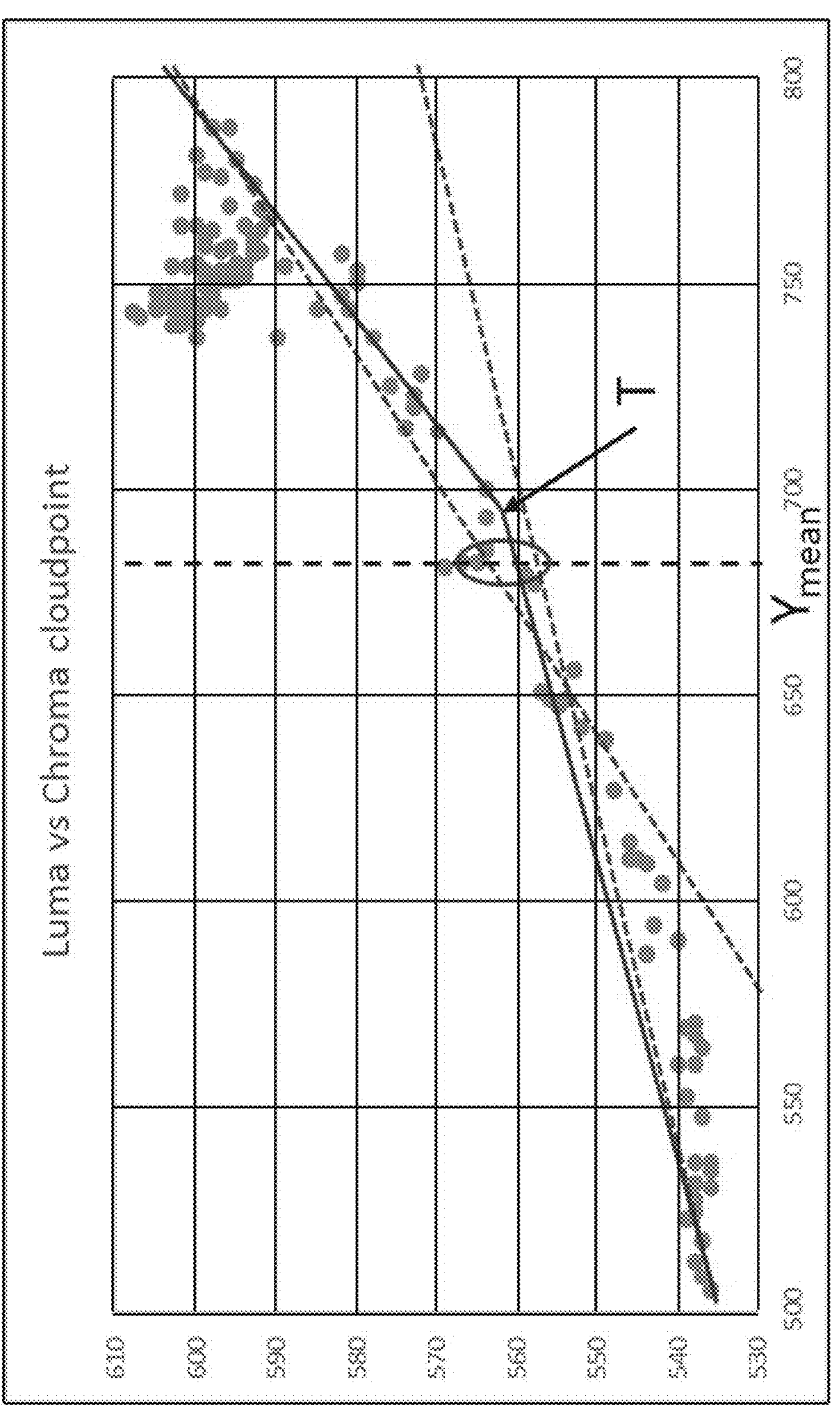
FIG. 6 illustrates a diagram of an example of classifying the neighboring samples into two groups based on the knee point, T, indicated by an arrow.

MMLM and LM modes may also be used together in an adaptive manner. For MMLM, two linear models are as follows:

$$\begin{cases} pred_C(i,j) = \alpha_1 \cdot rec'_L + \beta_1 & \text{if } rec'_L(i,j) \le \text{Threshold} \\ pred_C(i,j) = \alpha_2 \cdot rec'_L + \beta_2 & \text{if } rec'_L(i,j) > \text{Threshold} \end{cases} \quad (5)$$

where $pred_C(i,j)$ represents the predicted chroma samples in a CU and $rec_L'(i,j)$ represents the downsampled reconstructed luma samples of the same CU. Threshold can be simply determined based on the luma and chroma average values together with their minimum and maximum values. FIG. 6 shows an example of classifying the neighboring samples into two groups based on the knee point, T, indicated by an arrow. Linear model parameter $\alpha_1$ and $\beta_1$ are derived from the straight-line relationship between luma values and chroma values from two samples, which are minimum luma sample A ($X_A$, $Y_A$) and the Threshold ($X_T$, $Y_T$). Linear model parameter $\alpha_2$ and $\beta_2$ are derived from the straight-line relationship between luma values and chroma values from two samples, which are maximum luma sample B ($X_B$, $Y_B$) and the Threshold ($X_T$, $Y_T$). Here $X_A$, $Y_A$ are the x-coordinate (i.e. luma value) and y-coordinate (i.e. chroma value) value for sample A, and $X_B$, $Y_B$ are the x-coordinate and y-coordinate value for sample B. The linear model parameters $\alpha_i$ and $\beta_i$ for each group, with i equal to 1 and 2 respectively, are obtained according to the following equations.

$$\alpha_1 = \frac{Y_T - Y_A}{X_T - X_A} \quad (6)$$
$$\beta_1 = Y_A - \alpha_1 X_A$$
$$\alpha_2 = \frac{Y_B - Y_T}{X_B - X_T}$$
$$\beta_2 = Y_T - \alpha_2 X_T$$

For a coding block with a square shape, the above equations are applied directly. For a non-square coding block, the neighboring samples of the longer boundary are first subsampled to have the same number of samples as for the shorter boundary.

Besides the scenario wherein the above template and the left template are used together to determine the linear model coefficients, the two templates also can be used alternatively in the other two MMLM modes, called MMLM_A, and MMLM_L modes respectively.

In MMLM_A mode, only pixel samples in the above template are used to calculate the linear model coefficients. To get more samples, the above template is extended to the size of (W+W). In MMLM_L mode, only pixel samples in the left template are used to calculate the linear model coefficients. To get more samples, the left template is extended to the size of (H+H).

Note that when the upper reference line is at the CTU boundary, only one luma row (which is stored in line buffer for intra prediction) is used to make the down-sampled luma samples.

For chroma intra mode coding, there is a condition check used to select LM modes (CCLM, LM_A, and LM_L) or multi-model LM modes (MMLM, MMLM_A, and MMLM_L). The condition check is as follows:

$$\begin{cases} \text{LM modes if } (((Y_T - Y_A) \le d \;||\; (Y_B - Y_T) \le d \;\&(\text{block area} \ge \text{BlkSizeThres}_{LM})) \\ \text{MMLM modes if } (((Y_T - Y_A) > d \;\&\&\; (Y_B - Y_T) > d)\&(\text{block area} \ge \text{BloSizeThres}_{MM})) \end{cases} \quad (7)$$

where $BlkSizeThres_{LM}$ represents the smallest block size of LM modes and $BlkSizeThres_{MM}$ represents the smallest block size of MMLM modes. The symbol d represents a pre-determined threshold value. In an example, d may take a value of 0. In another example, d may take a value of 8.

For chroma intra mode coding, a total of 8 intra modes are allowed for chroma intra mode coding. Those modes include five traditional intra modes and three cross-component linear model modes. Chroma mode signaling and derivation process are shown in Table 3. It is worth noting that for a given CU, if it is coded under linear model mode, whether it is a conventional single model LM mode or a MMLM mode is determined based on the condition check above. Unlike the case shown in Table 2, there are no separate MMLM modes to be signaled. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 3

Derivation of chroma prediction mode from luma mode when CCLM is enabled

| | Corresponding luma intra prediction mode | | | | |
|---|---|---|---|---|---|
| Chroma prediction mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

Local Illumination Compensation

Local Illumination Compensation (LIC) is an inter prediction technique to model local illumination variation between current block and its prediction block as a function of that between current block template and reference block template. The parameters of the function can be denoted by a scale $\alpha$ and an offset $\beta$, which forms a linear equation, that is, $\alpha*p[x]+\beta$ to compensate illumination changes, where p[x] is a reference sample pointed to by MV at a location x on reference picture. Since $\alpha$ and $\beta$ can be derived based on current block template and reference block template, no signaling overhead is required for them, except that an LIC flag is signaled for AMVP mode to indicate the use of LIC.

Figure 7:
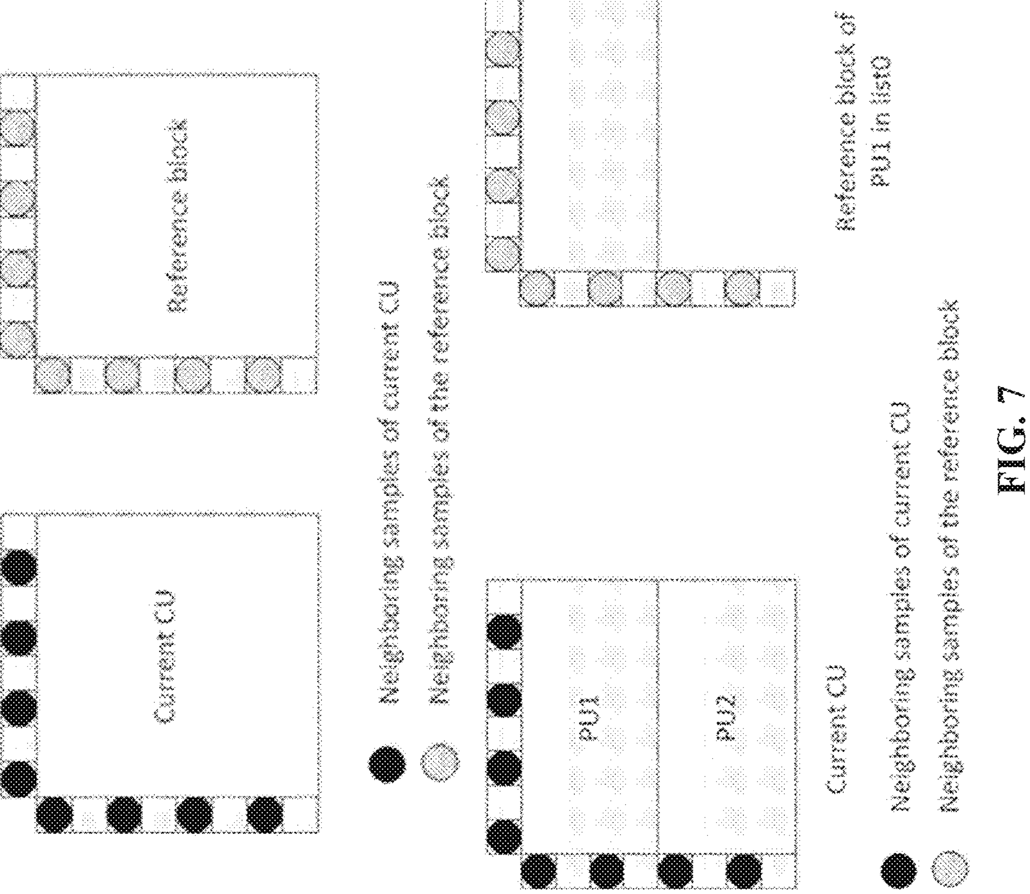
FIG. 7 illustrates neighboring samples used for deriving IC parameters.

When LIC applies for a CU, a least square error method is employed to derive the parameters $\alpha$ and $\beta$ by using the neighboring samples of the current CU and their corresponding reference samples. More specifically, as illustrated in FIG. 7, the subsampled (2:1 subsampling) neighboring samples of the CU and the corresponding samples (identified by motion information of the current CU or sub-CU) in the reference picture are used. The IC parameters are derived and applied for each prediction direction separately.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

Although the existing LIC can efficiently model local illumination variation, its performance can be still improved. On the other hand, the current LIC design also introduces significant complexity to both encoder and decoder design. The tradeoff between its implementation complexity and its coding efficiency benefit needs to be further improved.

In this disclosure, several methods are proposed to further improve the LIC coding efficiency or simplify the existing LIC design to facilitate hardware implementations. It is noted that the invented methods could be applied independently or jointly.

In general, the main aspects of the proposed technologies in the disclosure can be summarized as follows:

1. To simplify the computational complexity of the LIC, it is proposed to generate model parameters for LIC with more limited number of reference samples to reduce the calculation needed.
2. To improve the coding efficiency, one adaptive LIC scheme is proposed. Compared to the existing method where LIC is fixedly applied with one linear model, the proposed algorithm adaptively adjusts the number of linear model.

Figure 8:
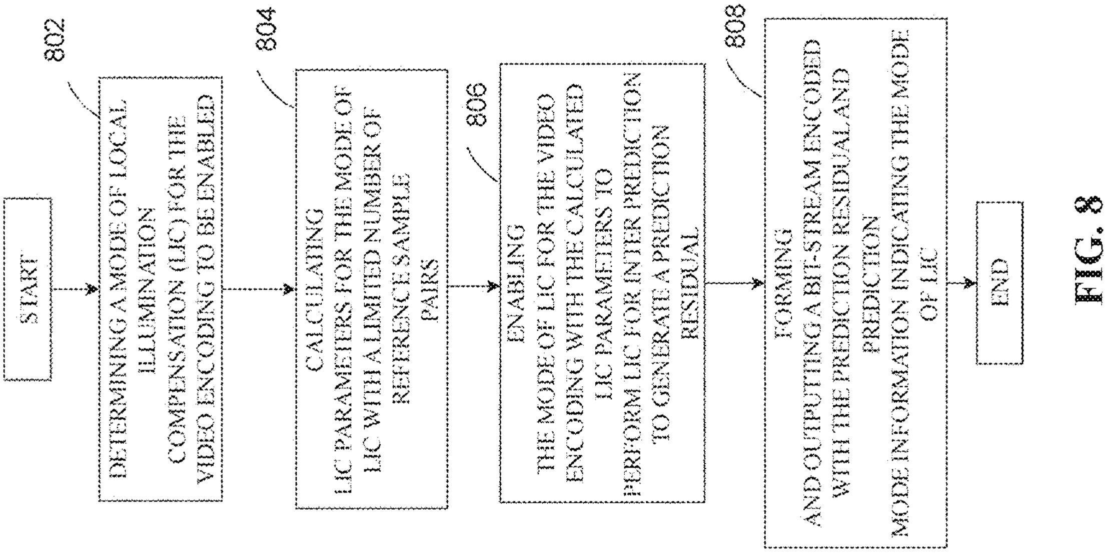
FIG. 8 illustrates a flow diagram of a method for video encoding according to an embodiment of the present disclosure.

Illumination Compensation (IC) Parameter Calculation with More Limited Number of Reference Samples In this disclosure, it is proposed to generate model parameters for LIC with more limited number of reference samples to reduce the calculation needed. FIG. 8 illustrates a flow diagram of a method for video encoding according to an embodiment of the present disclosure. In the first embodiment of this disclosure, as illustrated with reference to FIG. 8, at 802, it determines a mode of LIC for video encoding to be enabled. As described previously, in an example, if the histogram difference between the current picture and every reference picture of the current picture is smaller than a given threshold, the mode of LIC is disabled for the current picture; otherwise, the mode of LIC is enabled for the current picture. Additionally, in an example, the mode of LIC can be determined adaptively by a condition check based on block size. At 804, it calculates LIC parameters for the mode of LIC with a limited number of reference sample pairs. A reference sample pair refers to a luma reference sample and its corresponding chroma reference samples. In an example, only half of those reference sample pairs currently used in determining the LIC parameters is used. For example, those reference sample pairs can be selected in a spatially further down-sampled manner by taking one out of every two neighboring reference sample pairs into consideration in deriving the LIC parameters. At 806, it enables the mode of LIC for the video coding with the calculated LIC parameters to perform LIC for inter prediction to generate a prediction residual. As described previously, the prediction residual is formed by subtracting a prediction block from the current block, which reflects local illumination variation between the current block and prediction block. The prediction residual will be then added back to the prediction block to form a reconstructed block in decoding, as described with reference to FIG. 9 below. At 808, it forms and outputs a bit-stream encoded with the prediction residual and prediction mode information indicating the mode of LIC. The bit-stream will be sent to a decoder for video decoding.

Figure 9:
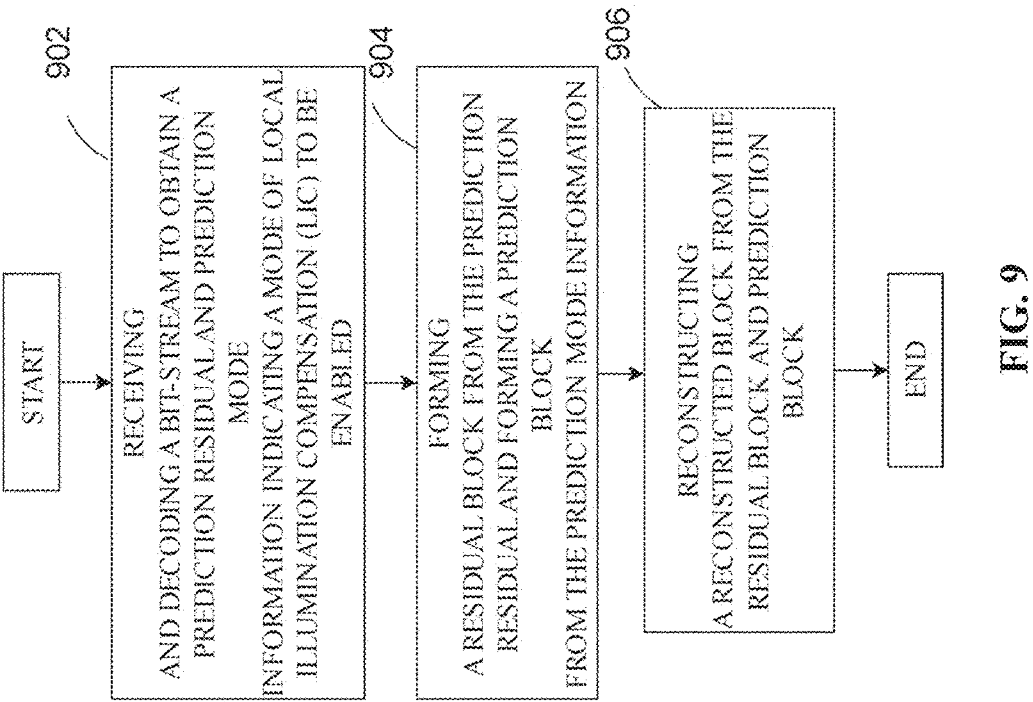
FIG. 9 illustrates a flow diagram of a method for video decoding according to an embodiment of the present disclosure.

FIG. 9 illustrates a flow diagram of a method for video decoding according to an embodiment of the present disclosure. At 902, it receives and decodes a bit-stream to obtain a prediction residual and prediction mode information indicating a mode of Local Illumination Compensation (LIC) to be enabled. In an example, the bit-stream is encoded as described with reference to FIG. 8. As described above, for example, LIC parameters for the mode of LIC are calculated with a limited number of reference sample pairs, and wherein a reference sample pair refers to a luma reference sample and a chroma reference sample. The prediction residual is formed by subtracting a prediction block from the current block during the video encoding, which reflects local illumination variation between the current block and prediction block. At 904, it forms a residual block from the prediction residual and forms a prediction block from the prediction mode information. At 906, it reconstructs a reconstructed block from the residual block and prediction block. As described above, for example, the residual block and prediction block are added together to form the reconstructed block.

In the second embodiment of this disclosure, the maximum number of reference sample pairs used in calculating the LIC parameters is limited to a pre-determined value based on the size and shape of corresponding chroma blocks. Four different examples (labelled as Method 1, 2, 3, and 4) are provided in Table 4, where the pre-determined value can be 2, 4 and/or 8 depending on the size and shape of the chroma block of the current CU.

TABLE 4

Number of sample pairs for LIC parameter calculation in JEM and proposed method

| Chroma block size | JEM | Method 1 | Method 2 | Method 3 | Method 4 |
|---|---|---|---|---|---|
| Upper limit reference sample pairs | 64 | 8 | 8 | 4 | 4 |
| 2 × n/n × 2 | 4 | 2 | 4 | 4 | 2 |
| 4 × n/n × 4 (n >= 4) | 8 | 4 | 8 | 4 | 4 |
| 8 × n/n × 8 (n >= 8) | 16 | 8 | 8 | 4 | 4 |
| 16 × n/n × 16 (n >= 16) | 32 | 8 | 8 | 4 | 4 |
| 32 × 32 | 64 | 8 | 8 | 4 | 4 |

Figures 10, 11:
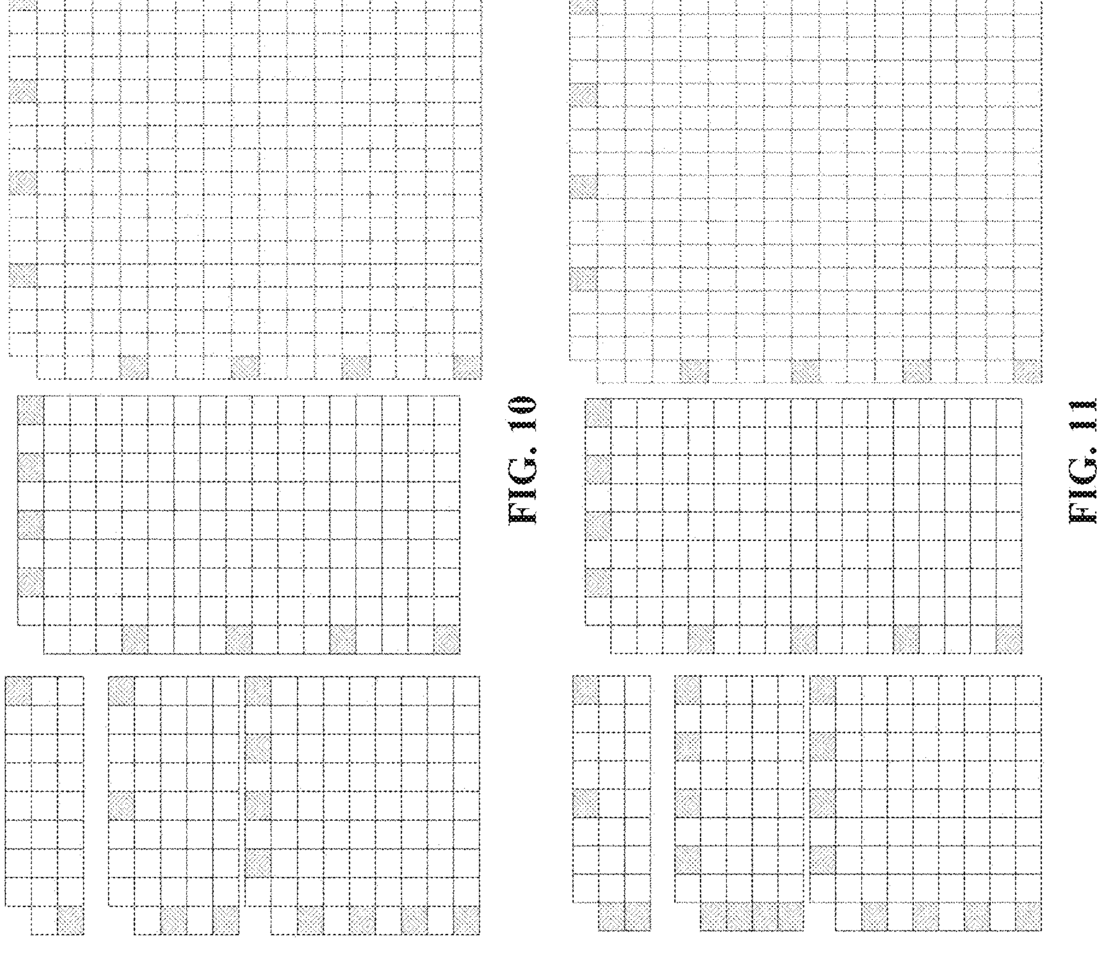
FIG. 10 illustrates a diagram of an example location of reference sample in method 1.
FIG. 11 illustrates a diagram of an example location of reference sample in method 2.
Figures 12, 13:
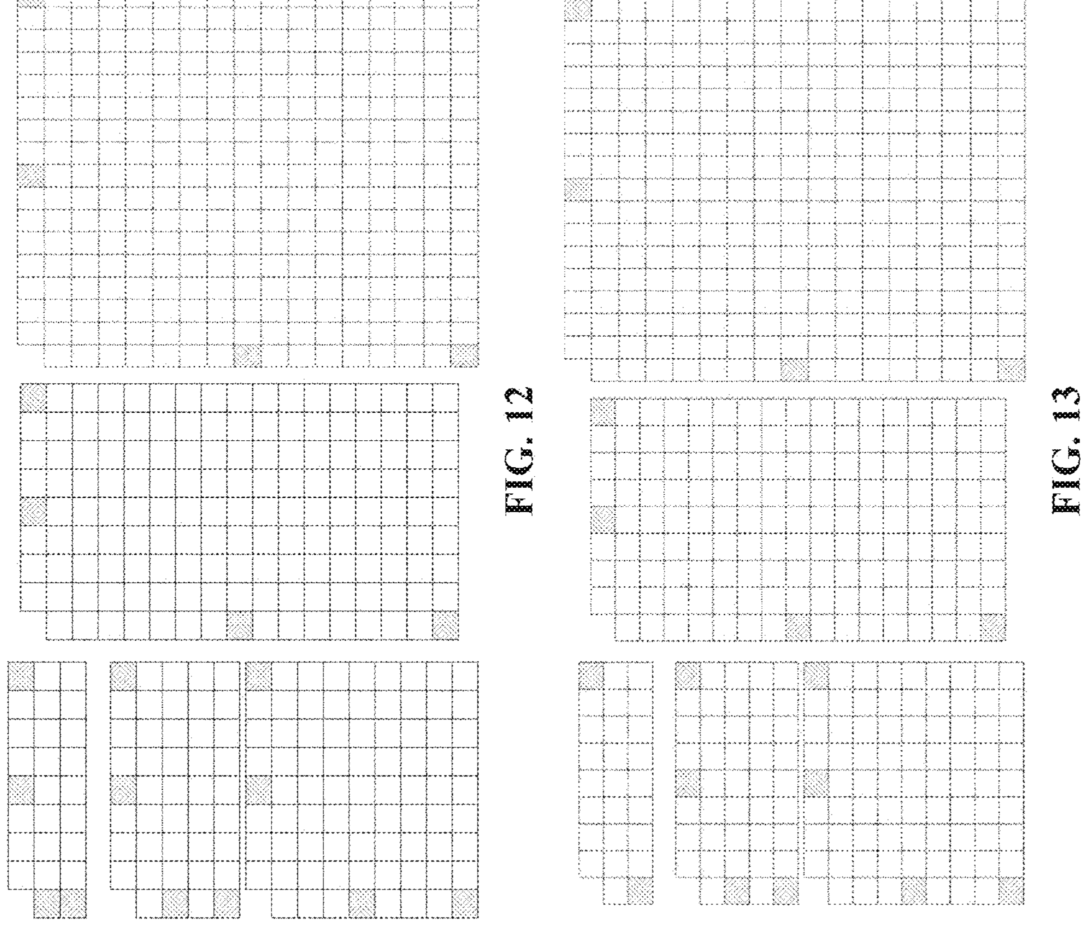
FIG. 12 illustrates a diagram of an example location of reference sample in method 3.
FIG. 13 illustrates a diagram of an example location of reference sample in method 4.

FIG. 10 shows an example location of reference sample in method 1. FIG. 11 shows an example location of reference sample in method 2. FIG. 12 shows an example location of reference sample in method 3. FIG. 13 shows an example location of reference sample in method 4.

In the third embodiment of this disclosure, only blocks with a block size equal or larger than a certain threshold may be used in forming the inter prediction of the LIC. In an example, the maximum number of reference sample pairs is limited to 8 and the minimum block size is limited to 8 or 16.

Multi-Model Local Illumination Compensation

In the fourth embodiment of this disclosure, it is proposed to add one or more Multi-model LIC (MMLIC) modes. In each MMLIC mode, the reference sample pairs are classified into a number of groups and the LIC parameters are calculated for each group. In an example, the reconstructed neighboring samples as the reference sample pairs are classified into two classes using a threshold which is the average of the neighboring reconstructed luma samples. The linear model of each class is derived using the Least-Mean-Square (LMS) method.

For example, for which the samples are predicted based on the reference samples pointed to by MV at a location x on reference picture by using two linear models as follows:

$$\begin{cases} pred(i,j) = \alpha_1 \cdot rec' + \beta_1 & \text{if } rec'(i,j) \le \text{Threshold} \\ pred(i,j) = \alpha_2 \cdot rec' + \beta_2 & \text{if } rec'(i,j) > \text{Threshold} \end{cases} \quad (8)$$

where pred (i,j) represents the predicted samples and rec'(i,j) represents the reference sample pointed to by MV at a location x on reference picture. Threshold is calculated as the average value of the reconstructed neighbouring samples. FIG. 5 shows an example of classifying the neighbouring samples into two groups based on the value Threshold. For each group, parameter $\alpha_i$ and $\beta_i$, with i equal to 1 and 2 respectively, are derived from the straight-line relationship between luma values and chroma values from two samples, which are minimum luma sample A ($X_A$, $Y_A$) and maximum luma sample B ($X_B$, $Y_B$) inside the group. Here $X_A$, $Y_A$ are the x-coordinate (i.e. luma value) and y-coordinate (i.e. chroma value) value for sample A, and $X_B$, $Y_B$ are the x-coordinate and y-coordinate value for sample B. The linear model parameters α and β are obtained according to the following equations.

$$\alpha = \frac{y_B - y_A}{x_B - x_A} \quad (9)$$

$$\beta = y_A - \alpha x_A$$

For a coding block with a square shape, the above two equations are applied directly. For a non-square coding block, the neighboring samples of the longer boundary are first subsampled to have the same number of samples as for the shorter boundary.

Since α and β can be derived based on current block template and reference block template, no signaling overhead is required for them, except that an MMLIC flag is signaled to indicate the use of MMLIC.

Besides the scenario wherein the above template and the left template are used together to calculate the linear model coefficients, the two templates also can be used alternatively in the other two MMLIC modes, called MMLIC_A, and MMLIC_L modes.

In MMLIC_A mode, only pixel samples in the above template are used to calculate the linear model coefficients. To get more samples, the above template is extended to the size of (W+W). In MMLIC_L mode, only pixel samples in the left template are used to calculate the linear model coefficients. To get more samples, the left template is extended to the size of (H+H).

Only Use MMLIC for the Parameter Derivation in the Conventional LIC Mode

In the fifth embodiment of this disclosure, it is proposed to only allow one or more MMLIC modes and disable the conventional LIC modes that are based on single model such that the LIC modes are replaced with the MMLIC modes. In this case, the condition check used to select LIC modes or multi-model LIC modes in the manner as described in the section of "Adaptive enabling of LM and MMLM for prediction" is no longer needed and multi-model LIC modes are always used. In particular, the condition check described in the equation (7) in the section can be applied for adaptively selecting the LIC modes and MMLIC modes.

Block Based Pixel Classification for Model Selection in MMLIC Mode

In the sixth embodiment of this disclosure, it is proposed to use block-based pixel classification to select different models in MMLIC mode. Currently, such classification is pixel based, i.e. each reconstructed luma sample is checked against a classification threshold and based on the comparison result a corresponding LIC model is selected for that pixel. According to this embodiment of the disclosure, such classification is done on a block level, with the classification decision applied to all pixels in the block. In an example, the block size may be N×M, wherein N and M are positive number such as 2 or 4. Taking both N and M are equal to 2 for example, the classification in this case is done on 2×2 block level. As a result, a same linear model would be selected for all four pixels in the block.

According to the disclosure, classification may be performed using different methods, involving all or just partial samples in the block. For example, the average of all samples in each N×M block may be used to decide which linear model to use for the block. In another example, for simplification, a classification may be made by simply checking one sample from each block to determine which linear model to use for the block. The one sample may be the top-left sample of each N×M block.

Three Model Based Local Illumination Compensation

In the seventh embodiment of the disclosure, it is proposed to use three parameter sets in local illumination compensation mode to compensate illumination changes. In particular, the reference sample pairs for calculating LIC parameters for the local illumination compensation mode are classified into three groups. In an embodiment, the parameters of the function can be denoted by a scale $\alpha$ and an offset $\beta$, which forms a linear equation, that is, the chroma samples are predicted based on the reconstructed luma samples of the same CU by using three linear models as follows: $\alpha$*p[x]+$\beta$ $$\begin{cases} pred(i,j) = \alpha_1 \cdot rec'_L(i,j) + \beta_1 \text{ if } rec'_L(i,j) \le \text{Threshold}_1 \\ pred(i,j) = \alpha_1 \cdot rec'_L(i,j) + \beta_1 \text{ if } rec'_L(i,j) > \text{Threshold}_1 \text{ and } rec'_L(i,j) \le \text{Threshold}_2 \\ pred(i,j) = \alpha_3 \cdot rec'_L(i,j) + \beta_3 \text{ if } rec'_L(i,j) > \text{Threshold}_2 \end{cases} \quad (10)$$

where pred (i,j) represents the predicted luma samples and rec_L'(i,j) represents reference sample pointed to by MV at a location (i,j) on reference picture. In an embodiment, $\text{Threshold}_1$ and $\text{Threshold}_2$ can be calculated by the maximum and minimum value of the neighbouring reconstructed luma samples (denoted as Lmax and Lmin respectively in the following). In an example, $\text{Threshold}_1$ and $\text{Threshold}_2$ can be calculated as follows:

$$\text{Threshold}_1 = \frac{1}{3} * L\max + \frac{2}{3} * L\min \quad (11)$$

$$\text{Threshold}_2 = \frac{2}{3} * L\max + \frac{1}{3} * L\min$$

In the eighth embodiment of the disclosure, $\text{Threshold}_1$ and $\text{Threshold}_2$ can be calculated as the average value of the neighbouring reconstructed luma samples. In an example, all neighbouring reconstructed luma samples are separated into two groups based on the average value of the neighbouring reconstructed luma samples. Luma samples with values smaller than the average value belongs to one group, and those with values not smaller than the average value belongs to another group. And $\text{Threshold}_1$ and $\text{Threshold}_2$ can be calculated as the average value of each group. With the value of $\text{Threshold}_1$ and $\text{Threshold}_2$ determined, the neighbouring reconstructed luma samples can be separated into three groups depending on the relationship between the luma value and the value of $\text{Threshold}_1$ and $\text{Threshold}_2$. For example, the first group contains the reconstructed luma samples with values range from the minimum luma sample value and $\text{Threshold}_1$. The second group contains the reconstructed luma samples with values range from $\text{Threshold}_1$ and $\text{Threshold}_2$. The third group contains the remaining reconstructed luma samples.

With samples divided into three groups, linear model parameters may be derived for each group respectively. In an example, parameter $\alpha$ and $\beta$ are separately derived from the straight-line relationship between luma values and chroma values from two samples, which are the minimum value luma sample and maximum value luma sample inside each of the three groups. In another example, linear model parameter $\alpha_1$ and $\beta_1$ are derived from the straight-line relationship between luma values and chroma values from two samples, which are the minimum value luma sample and the $\text{Threshold}_1$. Linear model parameter $\alpha_2$ and $\beta_2$ are derived from the straight-line relationship between luma values and chroma values from two samples, which are the $\text{Threshold}_1$ and the $\text{Threshold}_2$. Linear model parameter $\alpha_3$ and $\beta_3$ are derived from the straight-line relationship between luma values and chroma values from two samples, which are the maximum luma sample and the $\text{Threshold}_2$.

Model Classification Threshold Based on Reconstructed Luma Samples Inside the Current CU In the ninth embodiment of this disclosure, it is proposed to use the reconstructed luma samples inside a current CU to calculate the model classification threshold in cross-component linear model. In an embodiment, the threshold is calculated as the average value of the reconstructed luma samples inside a CU. In another embodiment, the threshold is calculated as the average value of the reconstructed luma samples inside the CU and the reconstructed luma samples neighbouring to the CU.

Model Classification Threshold Based on Minimum and Maximum Luma Sample

In the tenth embodiment of this disclosure, it is proposed to use the minimum and maximum samples to derive the model classification threshold. In an embodiment, the threshold is calculated as the (Max+min)/N where Max is the sample value of the maximum sample, min is the sample value of the minimum sample and N is any value (e.g. 2).

Position-Based Sample Classification

Figure 14:
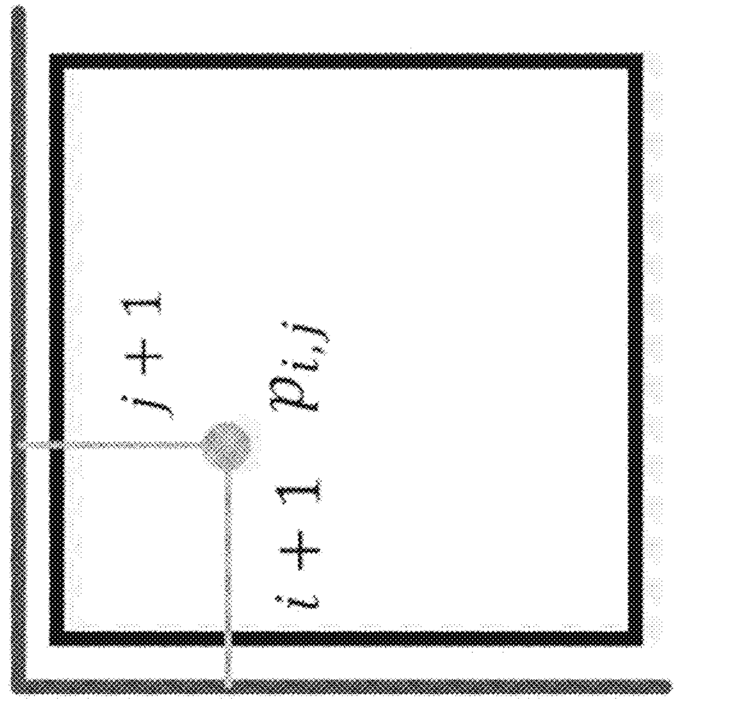
FIG. 14 illustrates the predicted sample weighting.

In the eleventh embodiment, the samples in the template and reference template are divided into two parts directly: the left/above templates and the left/above reference templates, which can be illustrated in FIG. 14. The left template and left reference template are used to derive linear model 1, denoted as $f_1$, and the above template and above reference template are used to derive linear model 2, denoted as $f_2$. When LIC is performed for the current sample located at (i,j) with reference sample $r_{i,j}$ linear model 1 and linear model 2 are used to generate two predicted samples:

$$p_{i,j}^1 = f_1(r_{i,j}) \text{ and } p_{i,j}^2 = f_2(r_{i,j}) \tag{12}$$

The two predicted samples are then weighted to generate the final prediction for the current samples, the weighting factors are derived based on the distance to the above and left template. The final prediction sample can be derived as follow.

$$p_{i,j} = \frac{(j+1)\times p_{i,j}^1 + (i+1)\times p_{i,j}^2}{i+j+2} \tag{13}$$

It should be noted that the above-mentioned embodiments focus on the motion compensation process of LIC. In addition, two methods are proposed when applying this embodiment into motion compensation.

In the first method, the proposed MMLIC is used to replace the current LIC.

In the second method, the proposed MMLIC is used as an alternative of the current LIC. In other words, for each block the proposed MMLIC or the LIC is selected and a flag is signaled to indicate whether LIC or MMLIC is used for the block.

Figure 15:
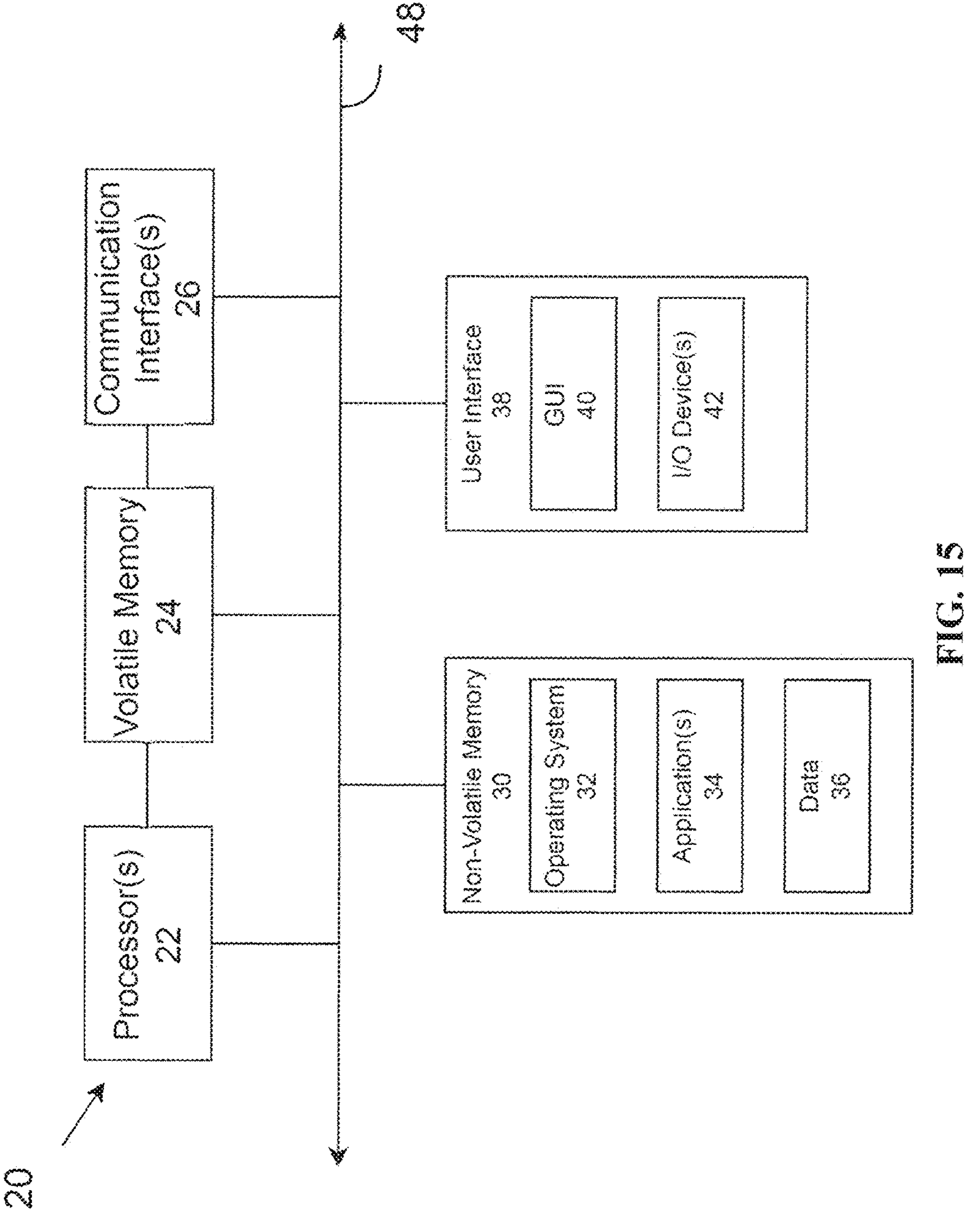
FIG. 15 illustrates a block diagram of a computing device for practicing an embodiment of the LIC for the video coding according to an embodiment of the present disclosure.

FIG. 15 illustrates a block diagram of a computing device 20 for practicing an embodiment of the LIC for the video coding according to an embodiment of the present disclosure. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

We claim:

1. A method for video decoding, comprising:

receiving and decoding a bit-stream to obtain a prediction residual and prediction mode information indicating a mode of Local Illumination Compensation (LIC) to be enabled;

forming a residual block from the prediction residual and forming a prediction block from the prediction mode information; and reconstructing a reconstructed block from the residual block and prediction block;

wherein LIC parameters for the mode of LIC are calculated with a limited number of reference sample pairs, and wherein a reference sample pair refers to a luma reference sample and a chroma reference sample, wherein one or more Multi-model LIC (MMLIC) modes are added to the mode of LIC, wherein in each MMLIC mode, the reference sample pairs are classified into a number of groups and the LIC parameters are calculated for each group, and wherein the reference sample pairs are classified into the number of groups by a threshold which is calculated by an average value of neighbouring reconstructed luma samples or the maximum and minimum value of the neighbouring reconstructed luma samples.

2. The method of claim 1, wherein the maximum number of reference sample pairs for calculating the LIC parameters is limited to a pre-determined value based on a size and shape of a chroma block.

3. The method of claim 1, wherein the limited number of reference samples pairs are selected by taking one out of every two neighboring reference sample pairs.

4. The method of claim 1, wherein the LIC parameters are calculated using up to 8 reference sample pairs.

5. The method of claim 1, wherein the mode of LIC is replaced with a MMLIC mode.

6. The method of claim 1, wherein the reference sample pairs are classified into the number of groups with block based pixel classification where a classification decision is applied to all pixels in a block.

7. The method of claim 1, wherein the reference sample pairs are classified into three groups.

8. The method of claim 1, wherein the threshold is calculated with reconstructed luma samples in a current block.

9. The method of claim 1, wherein LIC is performed with the calculated LIC parameters for each group of the number of groups to generate a number of predicted samples; and wherein the number of predicted samples are weighted to generate a final prediction.

10. The method of claim 1, wherein the mode of Local Illumination Compensation (LIC) is determined adaptively by a condition check based on block size.

11. An apparatus for video decoding, comprising:

a memory to store an instruction; and a processor to execute the instruction such that the processor is configured to:

receive and decode a bit-stream to obtain a prediction residual and prediction mode information indicating a mode of Local Illumination Compensation (LIC) to be enabled;

form a residual block from the prediction residual and form a prediction block from the prediction mode information; and reconstruct a reconstructed block from the residual block and prediction block;

wherein LIC parameters for the mode of LIC are calculated with a limited number of reference sample pairs, and wherein a reference sample pair refers to a luma reference sample and a chroma reference sample, wherein one or more Multi-model LIC (MMLIC) modes are added to the mode of LIC, wherein in each MMLIC mode, the reference sample pairs are classified into a number of groups and the LIC parameters are calculated for each group, and wherein the reference sample pairs are classified into the number of groups by a threshold which is calculated by an average value of neighbouring reconstructed luma samples or the maximum and minimum value of the neighbouring reconstructed luma samples.

12. The apparatus of claim 11, wherein the maximum number of reference sample pairs for calculating the LIC parameters is limited to a pre-determined value based on a size and shape of a chroma block.

13. The apparatus of claim 11, wherein the limited number of reference samples pairs are selected by taking one out of every two neighboring reference sample pairs.

14. The apparatus of claim 11, wherein the LIC parameters are calculated using up to 8 reference sample pairs.

15. The apparatus of claim 11, wherein the mode of LIC is replaced with a MMLIC mode.

16. The apparatus of claim 11, wherein the reference sample pairs are classified into the number of groups with block based pixel classification where a classification decision is applied to all pixels in a block.

17. A non-transitory machine-readable storage medium, having instructions stored on the medium, the instructions configured to, when executed, cause a machine to:

receive and decode a bit-stream to obtain a prediction residual and prediction mode information indicating a mode of Local Illumination Compensation (LIC) to be enabled;

form a residual block from the prediction residual and form a prediction block from the prediction mode information; and reconstruct a reconstructed block from the residual block and prediction block;

wherein LIC parameters for the mode of LIC are calculated with a limited number of reference sample pairs, and wherein a reference sample pair refers to a luma reference sample and a chroma reference sample, wherein one or more Multi-model LIC (MMLIC) modes are added to the mode of LIC, wherein in each MMLIC mode, the reference sample pairs are classified into a number of groups and the LIC parameters are calculated for each group, and wherein the reference sample pairs are classified into the number of groups by a threshold which is calculated by an average value of neighbouring reconstructed luma samples or the maximum and minimum value of the neighbouring reconstructed luma samples.

* * * * *